United States Patent [19]
Hermann, deceased et al.

[11] 3,839,209
[45] Oct. 1, 1974

[54] ORGANOMETALLIC ANTI-FRICTION COMPOSITIONS AND THEIR METHOD OF MANUFACTURE

[75] Inventors: Georges Hermann, deceased, late of Annecy, France by Marie T. Atalaphe; Jean C. D. Hermann, Annecy, France; Beatrice J. Hermann, Annecy, France; Frederic C. J. Hermann, Annecy, France; by Claude A. G. Hermann, Annecy, France; by Brigitte M. A. Hermann, Annecy, France heirs

[73] Assignee: Societe Industrielle des Coussinets, Paris, France

[22] Filed: Jan. 3, 1972

[21] Appl. No.: 215,167

Related U.S. Application Data

[63] Continuation-in-part of Ser. No. 809,941, March 24, 1969, abandoned.

[52] U.S. Cl. ............................................. 252/12
[51] Int. Cl..... C10m 7/16, C10m 7/06, C10m 7/04
[58] Field of Search ............ 252/12, 12.2, 12.4, 12.6

[56] References Cited
UNITED STATES PATENTS 2,214,104   9/1940   Hildabolt et al. .................... 252/12
2,956,848   10/1960  St. Clair............................... 252/12
3,467,596   9/1969   Hermann.............................. 252/12
3,516,933   6/1970   Andrews et al....................... 252/12

Primary Examiner—Daniel E. Wyman
Assistant Examiner—I. Vaughn
Attorney, Agent, or Firm—Pennie & Edmonds

[57] ABSTRACT

This invention relates to an organometallic reticulated anti-friction composition comprising at least one solid epoxy resin containing terminal epoxy groups and a molecular weight in the range from about 2,000 to 4,000 having incorporated therein from about 5 to 60 percent by weight of lead and/or bismuth powder or powdered alloys containing lead and/or bismuth, said reticulation having been caused by heating the composition for a sufficient period of time and at a sufficient temperature to effect said reticulation.

This invention also relates to metal bearings coated with said organo-metallic anti-friction compositions and their method of manufacture.

25 Claims, No Drawings

ORGANOMETALLIC ANTI-FRICTION COMPOSITIONS AND THEIR METHOD OF MANUFACTURE

CROSS-REFERENCE TO RELATED APPLICATION

This is a continuation-in-part of my earlier filed application Ser. No. 809,941, filed Mar. 24, 1969 and now abandoned.

SUMMARY OF THE INVENTION

The invention relates to the combination of epoxy resins and powders of lead or bismuth or powdered alloys containing these metals. The metals are present in the epoxy resin in sufficient amount to form a reticulate structure and to impart anti-friction properties thereto and can be used for any rolling or sliding elements where anti-friction or reduced friction is desired. Broadly stated, the organometallic anti-friction compositions of this invention comprise at least one solid epoxy resin from about 2,000 to 4,000 having incorporated therein from about 5 to 60 percent by weight of lead and/or bismuth powder or powdered alloys containing lead and/or bismuth, said reticulation having been caused by heating the composition for a sufficient period of time and at a sufficient temperature to effect said reticulation.

This invention also relates to metal bearings coated with said organo-metallic anti-friction compositions and their method of manufacture.

DESCRIPTION OF THE PREFERRED EMBODIMENTS

Many kinds of epoxy resins may be employed in the bearing compositions of this invention as long as they are solid epoxy resins containing terminal epoxy groups and have molecular weights in the range from about 2,000 to 4,000. Examples of epoxy resins possessing these characteristics, hereinafter, resins A, and which are therefore suitable for use in the organo-metallic anti-friction compositions of this invention include the glycidyl polymers which are produced by reacting epichlorohydrin with a hydroxylated hydrocarbon such as a polyol or phenol.

Glycidyl polymers which have been found to be useful include solid diglycidyl ethers of bisphenol A, the condensation products of epichlorohydrin with butanediol, glycerol, resorcinol and hydroquinone.

Other types of polyhydroxylated alcoholic or phenolic compounds can be used to form the epoxy terminated polymers useful according to this invention which will be readily apparent to those skilled in the art.

Minor amounts of numerous other types of epoxy resins, hereinafter, resins B, which do not have terminal epoxy groups but possess intermediate epoxy groups, have a molecular weight not in excess of 50,000 and are miscible with the solid epoxy-terminated epoxy resins at the elevated temperature normally used for blending the resins may advantageously be employed in combination with the solid epoxy-terminated epoxy resins. Examples of epoxy resins not having terminal epoxy groups which have been found useful in this invention include the cyclic and acyclic aliphatic epoxy resins which can possess several intermediate epoxy groups per molecule. Typical resins of this type that are advantageously employed include the "Oxiron" resins (FMC Corp.), the epoxidized derivatives of glycerides of unsaturated fatty acids, and cyclic aliphatic products such as limonene dioxide, vinyl cyclohexene dioxide and dicyclopentadiene dioxide. Epoxy compositions of this type are well known and other epoxy compositions can of course be used as will be apparent to those skilled in the art.

Advantageously from 40 to 95 percent of resin A can be employed and if resin B is combined with resin A, it is advantageous to add the former in an amount not exceeding about 20 percent of the total weight of the resins.

In addition, various lead and bismuth alloys can be used so long as the alloy contains at least one of the metals lead or bismuth. Examples of such alloys which are advantageously employed include binary and ternary alloys such as Pb-Bi, Pb-Sn, Bi-Sn, Pb-Bi-Sn, Pb-As, Pb-Cd, Pb-Ag, Pb-Sn-Sb, Pb-Sn-Cu, Pb-Sn-Sb-Cu-Cd, Pb-Sn-Sb-Cu-Ni, and so forth. Other alloys can be used as will be readily apparent to those skilled in the art.

The lead or bismuth or alloys herein are generally used in the form of more or spheroidal spherodial particles.

The amount of lead or bismuth that can be used in the alloys can be varied and will depend on the particular alloy employed. A sufficient amount of lead or bismuth should be used so that the advantageous results of this invention are obtained and the exact amount to obtain such results can be determined by routine experimentation by those skilled in the art. Some examples of particular metal powders that can be used include:

| Pb powder | Pb | 99.95 |
|---|---|---|
|  | $O_2$ | 0.20 |
| Grain size comprised between 5 and 50 microns. | | |
| Bi powder | Bi | 99.6 |
|  | $O_2$ | 0.20 |
| Grain size: 5 to 50 microns. | | |
| Pb-Sn powder | Pb | 70 |
|  | Sn | 30 |
|  | $O_2$ | 0.20 |
| Temperature of liquification: 256°C. | | |
| Bi-Sn powder | Sn | 90 |
|  | Bi | 10 |
| Bi-Sn-Pb powder | Pb | 70 |
|  | Sn | 20 |
|  | Bi | 10 |

Grain size: 50 to 50 microns.

The purity of the metals or alloys as well as the grain size and shape thereto to obtain the results of the invention can also be determined by those skilled in the art. The quantities of metal powder or alloys to be employed are generally between about 5 and 60 percent of the total weight (mixture of epoxy resins and metal powder). With Pb-based powders, these limits advantageously amount to between about 10 and 60 percent.

Lower metal contents than 5 percent generally result in incomplete reticulation or in excessive curing periods. Higher contents than 60 percent are deleterious to application and to the behavior of the compositions.

Not only do the metal powders herein cause reticulation, a large portion of these powders actually chemically combine with the epoxy resins to form organometallic compounds.

In addition to the epoxy resin and metal powder, other ingredients can be incorporated therein either separately or simultaneously including compounds capable of reducing the coefficient of friction such as lead sulphide, bismuth sulphide, neutral aluminum phosphate, neutral magnesium phosphate, as well as the products which are the subject of French Patent No. 1,380,678. (These phosphates and borophosphates moreover act as curing accelerators); one or more plasticizers such as dibutylphthalate, polyethylene glycol, propylene glycol, etc. if the subsequent conditions of use of the compositions render this desirable; a lubricating agent such as graphite, molybdenum bisulphide or tungsten bisulphide; one or more tensio-active agents such as, for example, commercial silicon compositions such as SIL-AID 11 of Societe des Silicones.

For the production of the compositions according to the invention, the epoxy resins are first melted. Then the liquid adjuvants such as Sil Aid 11 and optionally a curing accelerator and a plasticizer (polyethylene glycol) are then incorporated therein. When this mixture is perfectly homogenous, it may have incorporated into it sulphide of lead or of bismuth or the lubricating and curing accelerator fillers hereinbefore cited, and then the metal powder or powders, whereupon a quick homogenization is performed. Depending on their physical state, the compositions may be employed quickly as they are or first cast into cold molds. The ingots or blocks obtained from the molds are broken up into granules or reduced to powder, according to its intended use. Too fine a granulometry promotes the oxidation of the final product and tends to divide the ingredients (separation of the uncombined metal and of the resins) so appropriate precautions should be taken when fine grinding is desired.

The granular or pulverulent compositions remain stable for several months, although they may be reticulated by heating for one to three hours at 190°C. In this condition, they may be applied to metal parts by the fluidised bed technique, by electrostatic spraying or by simple application in a uniform layer. A first heating operation is performed, during which a kind of fritting action occurs, the particles or granules being joined and welded together at the same time as gelation sets in. Calendering is then performed for the purpose of compaction and degasification, followed by final curing.

During the initial heating operation, the dwell period of the product in the oven may vary from 3 to a maximum of about 5 minutes. During this short period, the temperature is raised to about 190°–270°C. The oxidation may be considered to be negligible and an inert gas atmosphere is not essential.

For the actual curing operation, the dwell period in the oven can vary from about 12 to 120 minutes at temperatures comprising between about 190° and 270°C. Since polymerization of the composition may subject it to oxidation, the curing operation is preferably performed in a nitrogen atmosphere.

By way of example, the following tables show some weight percentage compositions of special interest which can be cured for 2 hours at 190°C. in a nitrogen atmosphere.

By way of example, the following tables shows some weight percentage compositions of special interest which can be cured for 2 hours at 190°C. in a nitrogen atmosphere.

TABLE I

| TYPES | A | B | C | D | E | F | G | H | I | J |
|---|---|---|---|---|---|---|---|---|---|---|
| Solid epoxy Resins A | 80 | 64 | 64 | 45 | 70 | 59 | 40 | 57 | 50 | 50 |
| Epxoy resin B | | | | | 10 | 10 | 5 | 7 | 15 | 15 |
| lead powder | 20 | 35 | | | 20 | 20 | 55 | 30 | 35 | 20 |
| bismuth powder | | | 35 | 55 | | | | | | |
| PbS | | | | | | | | 10 | | 5 |
| SIL AID 11 | | 1 | 1 | | | 1 | | 1 | | |
| Polyethylene blycol | | | | | | | | | | 15 |

TABLE II

| Lead powder | Pb-Sb powder Pb 95% Sb 5% by weight | Solid epoxy resin A | Epoxy resin B | Lead sulphide | Anhydrous AlPO$_4$ | Sil Aid 11 |
|---|---|---|---|---|---|---|
| | 37.5 | 50 | 6.5 | 5 | | 1 |
| 37 | | 49 | 6.0 | 5 | 2.4 | 0.6 |
| 30 | | 60 | | 6 | 3.0 | 1.0 |

Curing of these compositions takes place in 10 minutes at a temperature of 260°C. and an inert or nitrogen atmosphere is not indispensible.

A typical manufacturing sequence for the organometallic anti-friction compositions in conjunction with this application to a metal bearing can be as follows:

STEP ONE: Obtaining resin A, as for example, by reacting an epihalohydrin with a polyhydroxylated alcohol or phenol or obtaining a mixture of resin A and resin B.

STEP TWO: Adding over a very brief period to resin A or to a mixture of resins A and B in the molten state, the lead alloys of lead and/or bismuth along with adjuvants such as a silicone resin, curing accelerator, plasticizer and lead or bismuth sulfide as a lubricant.

STEP THREE: Rapidly cooling the mixture. The rapidity with which this step and STEP TWO is carried out has for its purpose the causing of a partial reticulation of the mixture.

STEP FOUR: Grinding the solid obtained from rapid curing.

STEP FIVE: Depositing the powder upon the metal bearing.

STEP SIX: Swiftly heating the assembly in order to soften and melt the powder.

STEP SEVEN: Calendering the assembly.

STEP EIGHT: Adding a very thin layer of a tensio-active substance.

STEP NINE: Heating the assembly for a sufficient period of time and at a sufficient temperature to accomplish complete reticulation, usually about twelve minutes.

Advantageously, after STEP FIVE, an additional step may be carried out, namely, the addition of an organic sublimable agent, advantageously, trimellitic anhydride, to the powder.

The new materials according to the invention are characterized by great adhesion to metal surfaces. Endowed with excellent mechanical properties, they have a remarkable chemical inertia, excellent resistance to oil at 150°C. and to boiling water, they are easily drilled, stamped, rolled and shaped. Their application, continuous or otherwise, is very easy and they are cured quickly without emission of volatile products.

The following examples are illustrative of the invention:

EXAMPLE I

A mild steel base of 510 × 35 × 1.87 mm. was degreased by means of trichloroethylene vapors. It was then pickled according to procedure disclosed in French Patent No. 1,488,406, then rinsed and dried.

The base thus prepared then had applied to it a layer 34 mm. wide and 1.6 mm. thick of an anti-friction composition according to the invention, of granulometry 5/10 m/m, prepared in the following manner:

Epoxy resin A, a condensation product of epichlorohydrin and bisphenol A, having a molecular weight between 2,000 and 4,000 (350g) was melted at 200°C. in a stainless steel vessel, with 50g of epoxy resin B (an epoxided polybutadiene containing more than two epoxy groups) under a nitrogen atmosphere and with stirring. After homogenization, 5g of Sil Aid 11 was quickly introduced; mixing was performed after which there was introduced 40g of powdered synthetic lead sulphide obtained by the dry process (grains of approximately 0.061 mm. diameter). Mixing was performed and 100 g of lead powder in grains of 0.050 mm. diameter were introduced; mixing was continued for one minute, after which the mixture was poured into massive cold molds. The ingots were stripped and crushed. The pieces were crushed into a powder which passed through a screen with meshes of 0.297 mm.

This powder was placed on the metal base, and heating was applied for three minutes at 190°C., and calendering was then performed (calender opening 2.10 mm.). Owing to the elasticity of the paste, the total thickness of the coated base amounted to 2.30 mm. The surface was rubbed with a felt pad impregnated with Sil Aid 11, after which curing was performed for 2 hours at 190°C. in a nitrogen atmosphere. Cooling was performed, still under nitrogen.

The surface of the anti-friction coating obtained was smooth, shiny and soft to the touch. It was rolled to a thickness of 2.15 mm., which represented an elongation of 6 percent. The product was tested for 360 hours in mineral oil raised to 150°C., and in boiling water at pH 8 for 360 hours. No measurable dimensional changes were observed.

The coated component was machined and formed into the shape of a bearing ring of 34 mm. external diameter, 30 mm. internal diameter and 20 mm. length.

This was fitted on a cemented steel spindle (55 Rockwell C). A load was applied in the amount of 125 kgs. per $cm^2$ of projected surface. The spindle revolved under hydrodynamic conditions with DTE BB Mobil oil for 15 hours at 390 r.p.m. and therefore 15 hours at 1330 r.p.m. After 30 hours of operation, the ring was dismantled and no measurable wear or creep were observed. In the same conditions, an anti-friction bronze bearing did not withstand starting load.

EXAMPLE 2

The procedure applied was that of Example 1, but the mild steel base was perforated with holes of 3 mm. diameter arranged in a staggered pattern, the minimum distance between holes being of 2 mm.

A pulverulent anti-friction composition was prepared in the following manner: 570 g of epoxy resin A. (a condensation product of epichlorohydrin and bisphenol A having a molecular weight between 2,000 and 4,000) were melted at 200°C. in a stainless steel vessel with 70g of epoxy resin B (an epoxided polybutadiene containing more than two epoxy groups per molecule) under a nitrogen atmosphere, with stirring. After homogenization, 50g of synthetic lead sulphide powder obtained by the dry process were introduced (grains of approximately 0.061 mm. diameter). Mixing was performed and 300 g of lead powder in the form of grains of a diameter of approximately 0.050 mm. were introduced; mixing was continued for one minute, after which the mixture was cast into massive cold molds. The ingots were stripped and broken up. The pieces were crushed into a powder which passed through a screen with meshes of 0.297 mm. The base was coated with this powder and heated for 3 minutes at 190°C. The same procedure as in Example 1 was then allowed.

After curing, the surface of the plastic coating was smooth and shiny; the coating did not cover the perforations of the base which remained wholly unobstructed.

The coated base was then cut into two parts. One of them was exposed to a bending test at a right angle with the coating at the outside; no cracking or separation was observed.

The other piece was rolled to 1.90 mm. thickness, producing an elongation of 6 percent. The holes were very slightly ovalized; a bending at right angle like above was then performed and no cracking or separation was observed.

The coated element was machined and shaped to form an anti-friction bearing ring having an internal diameter of 45.08 mm. and a length of 15 mm. A crankshaft was fitted into it and a load of 266 kgs. per $cm^2$ of projected surface was applied to the ring during 90° of the rotation. The crankshaft was coupled to an electric motor running at 1500 r.p.m., a device for greasing under a pressure of 1 kg/$cm^2$ assuring lubrication with DTE Heavy Medium Mobil oil. After 100 hours of continuous operation, the inner lining of the shell had not incurred any wear, apparent cracking or separation.

The SIL AID, which can be used according to this invention is a conventional silicone resin, such as polymethyl siloxane or polymethylphenyl siloxanes. Other materials can of course be used to perform the function of the SIL AID as will be apparent to those skilled in the art.

This invention further includes the use of organic compositions which are capable of regular and continuous sublimation at least to the point of gelation in preparing the lead, bismuth, or alloys thereof—epoxy resin compositions. The sublimation temperatures of the organic compositions can be varied depending upon the particular curing temperatures used but is preferably between 200° and 260°C.

Various organic compositions can be used which are capable of sublimation at least to the point of gelling of the epoxy resins employed, including by way of example, hydroquinone, resorcinol, the anhydrides of maleic, phthalic, trimellitic, and pyromelletic acids, hexachloroendomethylenetetrahydrophthalic anhydrides, terephthalic acid and hexamethylenetetramine. Other organic compositions or mixtures thereof can be used as will be readily apparent to those skilled in the art.

The amount of the organic sublimable composition to be used will depend mainly on the temperature in which organic compositions are cured and on their speed of gelation and hardening. Thus, for example, a composition having a high content of lead, such as 60 percent, reticulates quickly and leads to a porous final product if the sublimable composition does not have time to undergo sublimation, that is to say, if the speed of sublimation is too low, the quantity of the sublimable composition used may be varied from about 0.1 to 1 percent of the weight of the resin. Quantities other than this can of course be employed so long as the advantageous results of this invention are obtained and the exact quantities can be determined by routine experimentation by those skilled in the art.

The preparation of organic metallic compositions in accordance with this feature of the invention can be accomplished as follows:

800g of resin A (a condensation product of epichlorohydrin and bisphenol A having a molecular weight between 2,000 and 4,000) are rapidly melted at 280°C. in a nitrogen atmosphere with stirring in a stainless steel vessel together with 100g of resin B (epoxided polybutadiene having more than 2 epoxy groups). The molecular weight of resin B is higher, preferably about 50,000, as described above. 12g of a tensio-active silicone material, such as SIL AID, previously referred to, are also melted in this container together with the resins. After complete melting and homogenization, the mass is allowed to cool to 180°C. There are then introduced 400g of lead powder in the form of grains of approximately 0.05 mm. diameter. The total is mixed vigorously for 45 seconds and the mix is then poured into massive cold molds.

The castings are then removed from the molds and broken up, the pieces ground to a powder which is passed through a screen having a mesh size of 0.297 mm.

One thousand grams of this powder are then charged into a ball mill with 5g of phthalic anhydride in powdered form as a sublimable substance and the total is mixed for 15 hours. The powder is then ready for use.

The method of the invention makes it possible to avoid the formation of bubbles or blisters during rapid and continuous reticulation of epoxy-resin-lead or bismuth compositions in the form of films. The thickness of the film is moreover increased. The improvement in compactness thus obtained results in an improvement of numerous physical properties of the material, in particular its tensile strength, its compression strength, and its resistance to folding or creasing. The properties of the compositions in their adherence to metallic supports are unchanged.

The invention also further contemplates the use of antimony sulfide in compositions to lower the coefficient of friction thereof.

The sublimable organic materials can be used to produce the organometallic compositions of this invention in different manners as will be apparent to those skilled in the art. They are advantageously added to the epoxy resin powders containing the lead or bismuth or alloys thereof continuously and at a uniform rate with the addition continuing at least up to the gelation point of the resin.

The following percentage composition (hereinafter referred to as composition D) was produced in a manner described above:

EXAMPLE 3

| Material | Parts by weight |
| --- | --- |
| Resin A (Same as in Example 2) | 450 |
| Powdered lead | 543 |
| Tensio-Active agent (SilAid) | 7 |
| | 1000 parts total |

A steel support was coated with composition D in powdered form. Before curing the thickness of the film was 0.37 mm. After curing for 12 minutes at 260°C. in a normal atmosphere the thickness was 0.6 mm. There was thus an increase in thickness of 0.23 mm. Extension of elongation at the point of rupture amounted to 4 percent. The average of three tensile strength values was 365 kg/$cm^2$.

To 200 grams of composition D there were then added in accordance with the invention 0.3g of trimellitic anhydride. A steel support identical to the previous one was then coated with the new composition, reduced to powdered form. Before curing the average thickness was 0.41 mm. After curing for 12 minutes at 260°C. in a normal atmosphere the average thickness had increased to 0.44 mm. for an increase of 0.03 mm.

The tensile strength, taken as the average on three test pieces, was 437 kg/cm².

To 200 grams of the last-mentioned composition (i.e. composition D with trimellitic anhydride) there were added 3.4g of $Sb_2S_3$. The resulting composition was reduced to powder and applied in the form of film on a steel support. Before curing the thickness was 0.42 mm.; after curing for 12 minutes at 260°C. in normal atmosphere the thickness amounted to 0.43 mm. for an increase of only 0.01 mm. On three test piece the average extension or elongation to rupture was 6.7 percent and the tensile strength was 517 kg/cm².

EXAMPLE 4

The following percentage composition was prepared in the same manner as previously described, hereinafter, denominated C:

|  | Parts by weight |
|---|---|
| Resin A | 560 |
| Resin B (Same as in Example 2) | 70 |
| Powdered Lead | 280 |
| Lead Sulfide | 70 |
| Tensio-active Agent Sil Aid | 8.5 |
| Neutral aluminum phosphate | 11.5 |
|  | 1000 parts total |

Resin A is a condensation product of epichlorohydrin and bisphenol A having a molecular weight of about 3,000.

As in Example 3, a metallic support was coated with this composition. Before curing, the film had a thickness of 0.55 mm. After the same curing step as that described in Example 3 the increase in thickness amounted to 0.1 mm. On these test pieces the average elongation to the point of rupture was 4.5 percent and the tensile strength was 417 kg/cm².

A modified composition C' was obtained by adding 0.5g of phthalic anhydride for each 100 g of composition C. The composition C' was then coated onto a metallic support, producing a film which was 0.4 mm. thick before curing and 0.42 mm. thick after curing. The increase hence amounted to only 0.02 mm. Elongation to the point of rupture was increased to 5.5 percent while the tensile strength was 482 kg/cm².

The composition C was further modified into a composition C'' by replacing the 70 grams or parts of lead sulfide with 42 grams of stibine (natural powdered antimony sulfide). The grains of this material had an average diameter of 0.06 mm. A steel support was coated with the composition C'', producing a film which had a thickness of 0.38 mm. before curing and a thickness of 0.42 mm. after curing. Elongation to the rupture point was 5.7 percent while tensile strength was 483 kg/cm².

The composition C'' was modified into a composition C''' by adding 0.5 g of phthallic anhydride to each 100g of the composition C''. There was thus obtained a joint action or cooperation of the stibine with the sublimable component. The thickness of the film obtained on a support was 0.43 mm. before curing and 0.426 mm. after curing, i.e., a reduction in thickness of 0.004 mm., contrary to the case in the previously given example. The material underwent an elongation of 7.25 percent in length before rupture while the tensile strength was 589 kg/cm².

EXAMPLE 5

The following percentage composition was prepared

|  | Parts by weight |
|---|---|
| Epoxy resin resulting from condensation of epichlorohydrin and bisphenol A having a molecular weight of about 3000 | 566 |
| Resin B | 71 |
| Powdered Lead | 283 |
| Stibine | 42.5 |
| Trimellitic anhydride | 28.3 |
| Tensio-active agent Sil Aid | 8.4 |
| Phthalic anhydride | 0.7 |
|  | 1000 parts total |

Resin B is a non-glycidyl polymer, namely epoxided polybutadiene having more than two epoxy groups manufactured by Food Machinery and Chemical Corp. under the trade name Oxiran.

This powder was applied to a sheet of mild annealed steel 1000 mm. long, 60mm. wide, and 1.875 mm. thick.

After degreasing and roughening of the sheet by means of emery cloth, its thickness was 1.855 millimeters. A coating of 1.25 mm. uniform thickness of this powder was then spread over the sheet. The sheet with the powdered layer thereon was then passed through an oven wherein it was heated for 2 minutes at 260°C. The coated sheet was then rolled to compact the powdered layer, producing an overall thickness of 2.150 mm.

The curing proper was then effected by carrying the coated sheet to 263°C. in ambient atmosphere for 12 minutes and 30 seconds. The coated sheet was then cooled on emerging from the oven.

The thickness of the coated sheet was 2.150 mm. There had been no increase in thickness. The coated sheet exhibited the following properties:

| Tensile strength | 607 kg/cm² |
|---|---|
| Compression strength at 200°C. | 248 kg/cm² |
| Elongation | 7.1% |
| Impact Resistance | Excellent. A steel ball 42 mm. in diameter weighing 280 grams falling 2 meters produced no cracks in a film of material 0.50 millimeters thick. |

A final rolling operation was then carried out, producing a 4 percent increase in length and reducing the thickness to 2.07 mm.

The steel sheet thus coated was cut into three identical rings each having an interior diameter of 30.06 mm. and a width of 25 mm. Three lubricating grooves were then cut into each ring, one in the median plane and the others intersecting the first at 45° angles. These grooves were filled with Mobilux grease No. 2. Each ring was then engaged on a mild steel shaft 30 mm. in diameter, the grease grooves being disposed in the loading zone. The first ring was then loaded to 54 kilograms. Its shaft was rotated at 1420 r.p.m. The PV amounted to 100,000 kg/cm² x cm/mn.

PV = (Applied load in kg/Projected area of the bearing in cm²) $\times pd\ n$

In this equation, d is the diameter of the shaft and n is the r.p.m. thereof.

The second ring was loaded with 94 kg. and its shaft was rotated at 220 r.p.m. The PV amounted to 25,000 kg/cm² x cm/mn.

The third ring was loaded with 54 kg., its shaft was rotated 920 r.p.m. and the PV was 50,000 kg/cm² x cm/mn.

In these three test cases, the test was continued for 540 hours. After testing, the first ring showed a wear of 4 microns, the second a wear of 7 microns, and the third a wear of 5 microns. In all three cases, the coefficient of friction was between 0.001 and 0.034.

These tests show that the combined action of stibine and the two anhydrides produce compact materials having remarkable properties, namely, good resistance to heat, good resistance to wear, and a low coefficient to friction.

These new compositions of matter of the invention also possess great adherence to metallic bases or supports. Having excellent mechanical properties, high chemical inertia, high resistance to oil even at 150°C. and to boiling water, they can be readily machined, stamped and shaped. They are readily applied in continuous fashion, and cure rapidly without giving off volatile vapors.

I claim:

1. An organometallic reticulated anti-friction composition obtained from about 40–95 percent by weight of at least one solid epoxy resin containing terminal epoxy groups and having a molecular weight in the range from about 2,000 to 4,000 and from about 5 to 60 percent by weight of lead powder, bismuth powder, mixtures thereof, and alloys comprising lead, bismuth, lead and bismuth, and mixtures thereof, said reticulation having been caused only by heating the composition for a sufficient period of time and at a sufficient temperature to effect said reticulation.

2. The composition of claim 1 wherein the solid epoxy resin is mixed with a second epoxy resin which does not contain terminal epoxy groups but contains intermediate epoxy groups, said second epoxy resin having a molecular weight not in excess of about 50,000 and being miscible with the first mentioned epoxy resin at the temperature employed for blending the resins.

3. The composition of claim 1 wherein the solid epoxy resin is the reaction product of an epihalohydrin and a hydroxylated hydrocarbon.

4. The composition of claim 3 wherein the hydroxylated hydrocarbon is a phenol or polyol.

5. The composition of claim 2 wherein the second epoxy resin is a cyclic or acyclic aliphatic epoxy resin.

6. The composition of claim 2 wherein the second epoxy resin is present in an amount not exceeding 20 percent of the weight of combined resins.

7. The composition of claim 1 in which the alloy is selected from at least one member of the group consisting of Pb-Bi, Pb-Sn, Bi-Sn, Pb-Bi-Sn, Pb-Sn-Sb, Pb-Sn-Sb-Cu, Pb-Sn-Cu-Cd or Pb-Sn-Sb-Cu-Ni.

8. The composition of claim 1 which contains a minor and coefficient of friction reducing amount of at least one inorganic solid lubricant compound of the group consisting of graphite, molybdenum bisulfide, tungsten bisulfide, lead sulfide, bismuth sulfide, neutral aluminum phosphate, neutral magnesium phosphate, borophosphates and antimony sulfide.

9. The composition of claim 1 which contains a minor and an effective amount of a silicone tensio-active agent.

10. The composition of claim 1 which contains a minor amount of a plasticizing agent.

11. The composition of claim 1 in which the epoxy resin and metal powder mixture contains a minor amount of an organic sublimable compound prior to reticulation by heating.

12. The composition of claim 11 in which the sublimable compound is hydroquinone, resorcinol, terephthalic acid, hexamethylenetetraamine or maleic, phthalic, trimellitic, pyromellitic or hexachloroendomethylenetetrahydrophthalic anhydride in the amount of from about 0.1 to 1.0% of the weight of the epoxy resin.

13. The method of producing an organometallic antifriction composition which comprises adding from 5 to 60% by weight of lead powder, bismuth powder, mixtures thereof, and alloys comprising lead, bismuth, lead and bismuth, and mixtures thereof to from about 40–95 percent by weight of at least one solid epoxy resin containing terminal epoxy groups and a molecular weight in the range from about 2,000 to 4,000 and heating the mixture of resin and metal powder at a temperature of at least 190°C. and for at least 12 minutes to cause the reticulation thereof.

14. The method of claim 13 wherein the solid epoxy resin is mixed with a second epoxy resin which does not contain terminal epoxy groups but contains intermediate epoxy groups, said second epoxy resin having a molecular weight not in excess of about 50,000 and being miscible with the first mentioned epoxy resin at the temperature employed for blending the resins.

15. The method of claim 13 wherein the solid epoxy resin is the reaction product of an epihalohydrin and a hydroxylated hydrocarbon.

16. The method of claim 15 wherein the hydroxylated hydrocarbon is a phenol or polyol.

17. The method of claim 16 wherein the second epoxy resin is a cyclic or acyclic aliphatic epoxy resin.

18. The method of claim 15 wherein the second epoxy resin is present in an amount not exceeding 20% of the weight of combined resins.

19. The method of claim 13 in which the alloy is selected from at least one member of the group consisting of Pb-Bi, Pb-Sn, Bi-Sn, Pb-Bi-Sn, Pb-Sn-Sb Pb-Sn-Sb-Cu, Pb-Sn-Cu-Cd or Pb-Sn-Sb-Cu-Ni.

20. The method of claim 13 which contains a minor and a coefficient of friction reducing amount of at least one inorganic solid lubricant compound of the group consisting of graphite molybdenum bisulfide, tungsten bisulfide, lead sulfide, bismuth sulfide, neutral aluminum phosphate, neutral magnesium phosphate borophosphates and antimony sulfide.

21. The method of claim 13 which contains a minor and an effective amount of a silicone tensio-active agent.

22. The method of claim 13 which contains a minor amount of a plasticizing agent.

23. The method of claim 13 which contains a minor amount of an organic sublimable compound.

24. The method of claim 23 in which the sublimable compound is hydroquinone, resorcinol, terephthalic acid, hexamethylenetetraamine or maleic, phthalic, trimellitic, pyromellitic or hexachloroendomethylenetetrahydrophthalic anhydride in the amount of from about 0.1 to 1.0 percent of the weight of the epoxy resin.

25. The method of producing organometallic antifriction compositions comprising:
a. melting from about 40–95 percent by weight of at least one solid epoxy resin containing terminal epoxy groups and a molecular weight in the range of about 2,000 to 4,000;
b. adding to the melted resin from about 5 to about 60 percent by weight of lead powder, bismuth powder, mixtures thereof, and alloys comprising lead, bismuth, lead and bismuth, and mixtures thereof;
c. rapidly cooling the mixture;
d. grinding the solid resulting from the cooling; and
e. heating this ground solid after compaction at a temperature of at least 190°C. and for at least 12 minutes to produce reticulation.

* * * * *

UNITED STATES PATENT OFFICE
CERTIFICATE OF CORRECTION

Patent No. 3,839,209    Dated October 1, 1974

Inventor(s) Georges Hermann

It is certified that error appears in the above-identified patent and that said Letters Patent are hereby corrected as shown below:

1. In Column 2, line 23 reads "more or spheroidal spherodial" should read --more or less spheroidal--.

line 49 reads "shape thereto" should read --shape thereof--.

2. In Column 10, line 65 reads "x pd.n" should read --x ¶d n--.

Signed and sealed this 4th day of February 1975.

(SEAL)
Attest:

McCOY M. GIBSON JR.  
Attesting Officer

C. MARSHALL DANN  
Commissioner of Patents